June 16, 1925.
J. G. JOHNSON
1,542,140
COMPRESSOR
Filed May 3, 1923
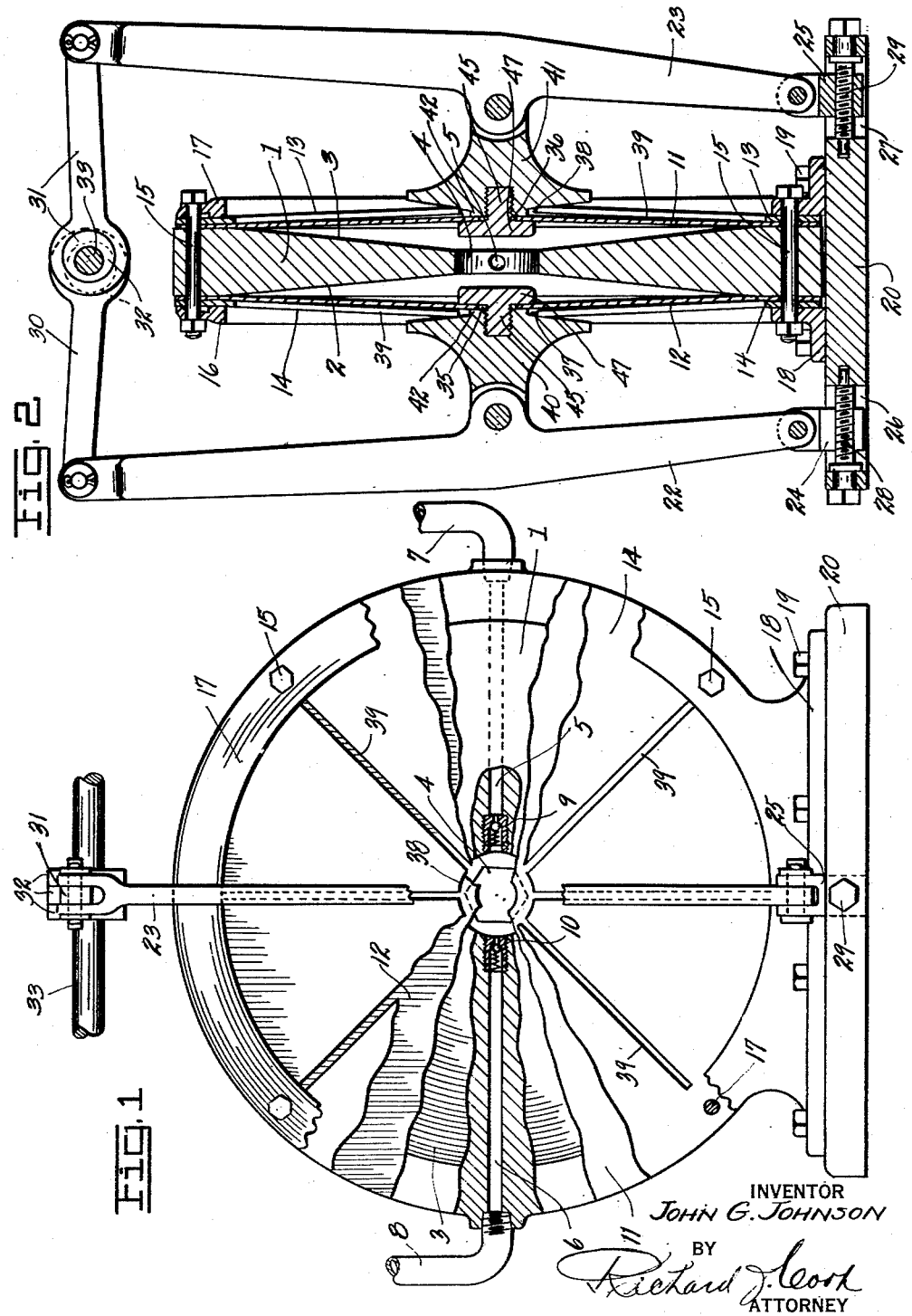
INVENTOR
JOHN G. JOHNSON
BY
ATTORNEY Patented June 16, 1925.

1,542,140

UNITED STATES PATENT OFFICE.

JOHN G. JOHNSON, OF TACOMA, WASHINGTON, ASSIGNOR OF ONE-HALF TO JOHN S. ANDERSON, OF TACOMA, WASHINGTON.

COMPRESSOR.

Application filed May 3, 1923. Serial No. 636,466.

*To all whom it may concern:*

Be it known that I, JOHN G. JOHNSON, a citizen of the United States, and a resident of Tacoma, Pierce County, Washington, have invented certain new and useful Improvements in Compressors, of which the following is a specification.

This invention relates to improvements in pumps, compressors, or the like, and more particularly to devices of that character especially adapted for use in connection with small ammonia ice making machines, or cooling systems; the principal object of the invention being to provide a compressor which, by the use of diaphragms of novel arrangement and mode of operation, avoids the use of pistons, valves, rods and all other parts that require packing and which need to be oiled.

Other objects of the invention reside in the various details of construction and combination of parts embodied in the invention and in the mode of operation of the device.

In accomplishing these and other objects of the invention I have provided the improved details of construction, the preferred forms of which are illustrated in the accompanying drawings, wherein—

Fig. 1 is a side elevation of a compressor constructed in accordance with the present invention, parts of which are broken away for better illustration.

Fig. 2 is a vertical section taken centrally through the device, particularly illustrating the shape of the central body and the arrangement of the diaphragms and their actuating means.

Referring more in detail to the drawings—

1 designates the central disk like body portion of the device, having conically concave opposite side faces 2 and 3 and provided centrally with a hole 4 that provides communication between the chambers at opposite sides of the disk and from which channels 5 and 6 lead through the body to opposite edges thereof where they connect respectively with pipes 7 and 8; the pipe 7, in cooling systems or ice making machines, would lead from the expansion or cooling coils and the pipe 8 would lead to the cooling tank wherein the ammonia vapor is cooled and compressed to liquid form.

The channel 5 is provided with a back check valve 9 which is of the character that permits an inflow of vapor but prevents any back flow, and the channel 6 has a back check ball valve 10 therein that permits an outflow but prevents any back flow into the compressor, when the parts are in operation as will presently be described.

Overlying the opposite side faces of the body plate 1 are thin flexible diaphragms 11 and 12, and overlying these are reinforcing disks 13 and 14, all of which are clamped tightly to the body by means of bolts 15 that extend therethrough and through clamping rings 16 and 17 disposed against opposite sides of the disks. These rings are provided with base flanges 18 through which bolts 19 are extended to secure the device rigidly to a base plate 20. If it is desired or necessary a suitable packing can be placed between the central body and edges of the diaphragms to prevent any possible leakage.

Located at opposite sides of the body, are levers 22 and 23 that are pivotally attached at their lower ends to blocks 24 and 25 that are movably fitted in slots 26 and 27 in the base plate and which may be adjusted from and toward the body 1 by turning the bolts 28 and 29 on which they are mounted and which are rotatably fixed in the base.

At their upper ends the levers are connected pivotally with the outer ends of links 30 and 31 which at their inner ends are mounted on eccentrics 32 on a revolubly driven shaft 33. The eccentrics are so located that, as the shaft rotates, the levers will be moved from and toward each other.

The diaphragms 11 and 12 are provided centrally with apertures 35 and 36, and the disks 13 and 14 have central openings 37 and 38 somewhat larger than the diaphragm apertures and have radially directed slots 39 leading therefrom to near the periphery of the disks; this will permit flexation of the parts between the slots as is required for the expansion and contraction of the diaphragms without removing the reinforcing pressure provided by use of the disks and permits the use of a very thin and flexible diaphragm.

Fixed pivotally to the levers between their ends, are connecting heads 40 and 41 provided with central projections 42 extended within the disk openings 37—38 and against the outer faces of the diaphragms, and having flare annular shoulders 42 tightly overlying the disks about the openings 37 and 38. Clamping bolts 45 are extended through the disk openings and are threaded into the clamping heads, and have heads 47 thereon whereby the diaphragms are clamped tightly against the inner faces of the clamping heads 40—41 to prevent any possible leakage. The apertures in the diaphragms are of greater diameter than the bolts, and the disk openings are of greater diameter than the central projections 42 on the clamping heads so that there can be relative slippage as the heads 40—41 move inwardly and outwardly.

Assuming that the device is so constructed and is connected in a cooling system as shown, its operation would be as follows:— As the cam shaft 33 revolves, the levers 23 and 23 are moved inwardly and outwardly from and toward each other and by means of the connecting heads 40 and 41 effects simultaneous inward and outward movement of the diaphragms 11 and 12, thereby producing the pumping effect whereby the ammonia vapor is drawn into the pump from pipe 7 and is driven out through pipe 8. The capacity of the pump may be regulated by the movement of the levers and size of the body.

It is readily apparent that by the use of such a device, no packing is needed, the use of oil is avoided and the usual oil separator used in ice machines is eliminated. It is also apparent that such a device can be made at a relatively small cost and would be very desirable for small systems.

I claim:

1. A device of the class described comprising in combination, a base plate, a circular body plate mounted on said base and having conically concaved opposite side faces and a central opening therethrough, and having valved inlet and outlet channels leading from its periphery into said central opening, flexible diaphragms secured upon opposite faces of the body plate to provide air tight chambers at opposite sides thereof, flexible reinforcing plates overlying said diaphragms, pumping heads fixed centrally to said diaphragms, a pair of pumping levers pivotally fixed to said heads and having ends pivotally and adjustably fixed to the base plate, a rotating shaft, eccentrics on said shaft and means connecting the eccentrics with said pump levers whereby said diaphragms will be moved simultaneously toward and from the body plate.

2. In a device of the class described, a body plate having a concave surface, a diaphragm overlying said surface forming an air tight chamber, valved inlet and outlet channels leading into said chamber, a reinforcing plate, overlying and clamped at its edges tightly over said diaphragm, said reinforcing plate being provided with a central opening and having radially extended slits leading from said opening whereby said plate may expand or contract, and a pumping head fixed centrally to the diaphragm with a shouldered portion overlying the reinforcing plate about said central opening, and means for actuating the pumping head.

Signed at Tacoma, Pierce County, Washington, this 16th day of April 1923.

JOHN G. JOHNSON.